May 31, 1955 P. E. ALLEN 2,709,314
LICENSE PLATE HOLDER
Filed May 23, 1952
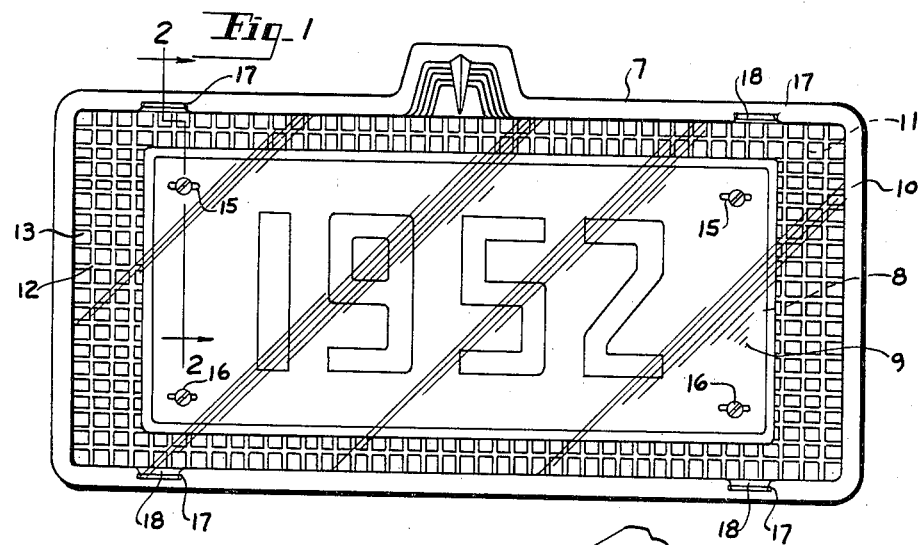
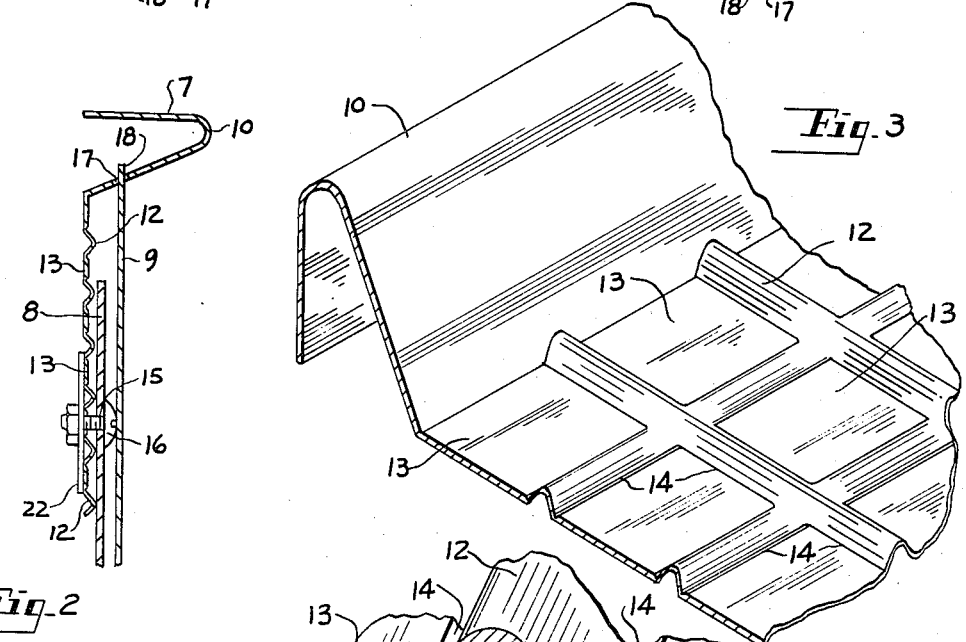
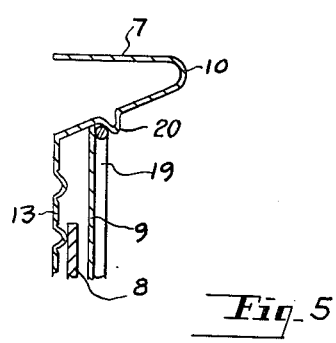
INVENTOR.
PERRY E. ALLEN
BY Edward M. Apple
ATTORNEY.

United States Patent Office 2,709,314
Patented May 31, 1955

2,709,314

LICENSE PLATE HOLDER

Perry E. Allen, Detroit, Mich.

Application May 23, 1952, Serial No. 289,608

6 Claims. (Cl. 40—125)

This invention relates to automobile accessories, and has particular reference to a holder for license plates.

An object of the invention is to provide a holder which is constructed and arranged so that any type of automobile license plate, regardless of shape or size, may be attached thereto.

Another object of the invention is to provide a license plate holder which is formed with a back ground having a multiplicity of comparatively small, closely spaced, knock out areas, so that the holder is readily adaptable for use with different license plates.

Another object of the invention is to provide a license plate holder which is constructed and arranged so that the license plate is supported throughout substantially its entire back surface area, whereby to prevent the bending or warping of the license plate, and to obviate any tendency of the license plate to vibrate or rattle.

Another object of the invention is to provide a license plate holder which may be attached to the conventional license plate bracket of an automobile, or which may be employed as a substitute for the bracket.

Another object of the invention is the provision of a license plate holder which is provided with means for entirely enclosing the automobile license plate, in order to protect the latter from damage from the elements, dust, etc.

The foregoing and other objects and advantages of the invention will become more apparent as the description proceeds, reference being made from time to time to the accompanying drawing forming part of the within disclosure, in which drawing:

Fig. 1 is a plan view of a device embodying the invention, with an automobile license plate mounted thereon.

Fig. 2 is a section taken substantially on the line 2—2 of Fig. 1.

Fig. 3 is an enlarged fragmentary detail in perspective, showing the manner in which the holder is constructed.

Fig. 4 is a still further enlarged fragmentary detail in perspective, illustrating portions of two of the knock out areas.

Fig. 5 is a section, similar to Fig. 2, but showing a modified form for securing the cover in place.

Referring now more particularly to the drawing, it will be understood that in the embodiment herein disclosed, the reference character 7 indicates, in general, the license plate holder. The reference character 8 indicates an automobile license plate attached thereto, and the reference character 9 indicates the transparent cover for the license plate 8.

The holder 7 is preferably formed of a sheet of metal or other suitable material, which is formed with a marginal bead 10, which serves as a frame for the holder 7 and the license plate 8. The back ground area 11, defined by the frame 10, is formed with a plurality of ribs 12 (Figs. 3 and 4) which extend across the face of the holder in waffle like arrangement. The ribs 12 are comparatively small, and are preferably spaced approximately one-fourth of an inch apart. The areas 13, defined by the ribs 12, are further outlined by marginal cuts 14, which extend substantially half way through the thickness of the material comprising the holder 7, so that the areas 13 may be readily knocked out with a punch or nail, or the like. The great multiplicity of knock out areas 13 make it possible to align the holes 15 in the license plate 8, with certain of the knock out areas 13, so that the attaching bolts 16 may also be extended through the holder 7 and the bracket 22. The ribs 12 also serve as abutments for the license plate 8, so that the same is supported rigidly on the holder 7 throughout substantially its entire area. Although I have shown the knock out areas 13 as being substantially square, it will be understood that they may also be made circular if so desired.

The frame portion 10 of the holder 7 is provided with a plurality of slots 17, which are adapted to accommodate tabs 18, formed on the transparent cover member 9. The cover member 9 may also be secured in position, as shown in Fig. 5, by means of a split spring ring 19, which engages a comparatively smaller bead 20, which may be formed along the inside periphery of the frame 10.

Having described my invention, what I claim and desire to secure by Letters Patent is:

1. A holder for an automobile license plate, which comprises a sheet of material having a unitary marginal frame and a back ground area which is made up of a plurality of spaced knock-out elements.

2. A holder for an automobile license plate, which consists of a unitary sheet of material formed with a marginal frame and a back ground area inside said frame, which back ground area is formed with a plurality of spaced ribs, said ribs outlining a multiplicity of spaced knock-out elements.

3. The structure defined in claim 2, including a transparent cover and means formed on said frame for holding said cover in position.

4. A license plate holder comprising a sheet of material having an outwardly extending integral marginal bead simulating a frame, a back ground area inside said frame, said back ground area being divided into a multiplicity of comparatively small, closely spaced knock-out elements, each of which is defined by a plurality of ribs.

5. In a device of the character described, in combination, an automobile license plate, and a holder for said plate consisting of a sheet of material formed with a peripheral bead arranged to frame said license plate, a back ground area within said frame, said back ground area having a plurality of ribs formed thereon, which ribs are arranged to contact and help support said license plate, and a plurality of knock-out elements in said back ground area alignable with apertures formed in said license plate.

6. The structure defined in claim 5, in which said back ground area has a multiplicity of cuts in its front surface closely paralleling said ribs whereby to facilitate the removal of said knock-out elements.

References Cited in the file of this patent

UNITED STATES PATENTS

| | | |
|---|---|---|
| 1,481,768 | Williams | Jan. 22, 1924 |
| 1,561,420 | Elliott | Nov. 10, 1925 |
| 1,699,191 | Holmes | Jan. 15, 1929 |
| 1,928,761 | Newman | Oct. 3, 1933 |
| 1,950,523 | Severn | Mar. 13, 1934 |